United States Patent [19]

Naidich

[11] 3,961,329
[45] June 1, 1976

[54] HIGH RESOLUTION SECTOR SCAN RADAR

[75] Inventor: Herbert H. Naidich, Trumbull, Conn.

[73] Assignee: United Technologies Corporation, Hartford, Conn.

[22] Filed: Apr. 14, 1975

[21] Appl. No.: 568,068

[52] U.S. Cl................................ 343/11 R; 315/385; 343/5 SC
[51] Int. Cl.² ...................... G01S 7/12; H01J 29/70
[58] Field of Search.......... 315/385; 343/5 SC, 11 R

[56] References Cited
UNITED STATES PATENTS

| | | | |
|---|---|---|---|
| 2,881,356 | 4/1959 | Van Alstyne | 315/385 |
| 2,927,317 | 3/1960 | Lundstrom | 315/385 X |
| 3,014,213 | 12/1961 | Brockway, Jr. | 343/11 R |
| 3,100,891 | 8/1963 | Brockway, Jr. | 343/11 R |
| 3,181,140 | 4/1965 | Naidich | 343/5 SC |
| 3,857,059 | 12/1974 | Larson | 315/385 X |

Primary Examiner—Malcolm F. Hubler
Attorney, Agent, or Firm—Dominic J. Chiantera

[57] ABSTRACT

A high resolution, azimuth sector scan radar is provided with sinusoidal operation to establish time sequencing of the radar main bang signal with the horizontal and vertical deflection signals of the video display and the antenna azimuth sweep. A high frequency master oscillator provides a fundamental sinusoidal signal to establish the pulse repetition rate of the radar main bang signal, while phase shift networks provide phase shifting of this signal to produce variable time delayed sinusoidal signals for the vertical deflection excitation and video unblanking of a CRT, to permit the display of selected range segments within the maximum range of the system. A submultiple frequency of the fundamental pulse repetition frequency signal, is synchronized with this signal and is used through similar phase shifting functions to provide video unblanking for the azimuth component of the display, horizontal deflection excitation for the CRT, and synchronization of the radar system and the radar antenna azimuth drive. The radar system features the use of simplified circuitry to produce the control timing, CRT deflection signals, and antenna azimuth sweep synchronization, to provide a system having small size and weight characteristics and being suitable for airborne use.

4 Claims, 3 Drawing Figures

HIGH RESOLUTION SECTOR SCAN RADAR

BACKGROUND OF THE INVENTION

1. Field of Invention

This invention relates to an azimuth sector scan radar system and more particularly to a low cost, high resolution sector scan radar.

2. Description of the Prior Art

As is well known to the prior art, azimuth sector scan radars are used to search out and pinpoint targets within a narrow azimuth section (±1° from relative azimuth bearing). These radar systems are typically used aboard military type aircraft for locating targets on the ground and for obtaining information relating to the range and relative azimuth bearing of the target from the aircraft, and presenting this information in a cockpit video display where it may be used by the pilot to control and direct the aircraft weapon systems. These systems must necessarily provide a high degree of accuracy, and must also provide a high resolution video image for the information being displayed on the video monitor. In addition, its airborne use requires that consideration be given to minimize the system size and weight.

The requirements for the video display include a bright clear video image, which allows observation of the video display in an open cockpit without the requirement of a hood over the face of the CRT, and also a short period of retention of the video image on the screen to accommodate the high mobility of the aircraft and the instantaneous change of target with respect to the aircraft. To achieve this, prior art systems have incorporated the use of a television raster type display which allows the use of a cathode ray tube with a short persistent phosphor. One such method of providing radar information on a raster display is disclosed in a patent to Breeze U.S. Pat. No. 3,653,044, wherein radar information from an antenna which scans through an azimuth angle of 180° within one and one-half seconds, and which transmits main bang synchronization signals at a frequency of approximately 810 Hz, is processed for presentation on a television raster which has a horizontal trace rate of 15.75 kHz and a vertical trace rate of 60 Hz. That system converts the low frequency radar video to the higher raster frequencies through the use of multiple scan converter stages which includes video storage and video mixer stages with synchronization between these stages provided by a multiple number of clock frequencies. This frequency conversion process requires the use of extensive and complex circuitry, in addition to a multiple number of precision timing bases, which has an adverse affect on system reliability in addition to system size and cost. That system, however, is representative of the state of the prior art with respect to providing the required video characteristics.

At the present time, the prior art methods of providing bright, high resolution, video displays of radar sector scan information through the use of low persistence cathode ray tubes have been limited to the use of such raster type presentations.

SUMMARY OF INVENTION

An object of the present invention is to provide an improved high resolution sector scan radar system, having small size and weight, making it suitable for use as airborne equipment.

According to the present invention, a sector scan radar system employs a first sinusoidal signal operating at the radar pulse repetition frequency (PRF) to provide through suitable phase shifts which create time delayed sinusoidal signals of the same frequency, the radar transmitter main bang signal, the range video unblanking, and the CRT display deflection in the range dimension (such as vertical deflection), and employs a second sinusoidal signal (operating at a frequency orders of magnitude lower in frequency than that of the first sinusoidal signal) to provide through suitable phase shifts which create time delayed sinusoidal signals of the same frequency, the azimuth video unblanking, the CRT display deflection in the azimuth dimension (such as horizontal deflection), and the synchronization of the antenna drive (which is scanned in azimuth in a sinusoidal fashion) with the CRT deflection in the azimuth dimension. In further accord with the present invention, the lower frequency second sinusoidal signal may be synchronized to the first sinusoidal signal so as to synchronize antenna drive with transmitter main bang, thereby to minimize display flicker.

According further to the present invention, a master sinusoidal signal, with a frequency equal to the PRF, controls the radar main bang signal transmission while simultaneously providing a sine wave signal to a pair of phase shift networks. The first network produces an output sine wave that is time delayed from the master sine wave by a selectable amount, determined by the distance between the radar and the range segment to be displayed, and is used as an input signal to a range video unblanking circuit of a CRT displaying range and azimuth information; the second network provides a delayed sine wave to a CRT vertical deflection amplifier, which uses the linear portion of the delayed sine wave to produce vertical deflection of the video signal during the period of unblanking.

In still further accord with the present invention, a sinusoidal signal, orders of magnitude lower in frequency than that of the master signal, is presented to a second pair of phase shift networks. The first network of the second pair produces a sine wave which is time delayed from the low frequency sinusoidal signal by a selectable amount determined by the difference between the total azimuth angle of antenna scan and the azimuth angular component thereof selected for display, and which is used as an input signal to an azimuth video unblanking circuit. The second network of the second pair provides a delayed sine wave to the CRT horizontal deflection amplifier, which uses the linear portion of the delayed sine wave to produce horizontal deflection of the video signal during the period of unblanking.

In still further accord with the present invention, an additional phase shifted sine wave of the lower frequency signal is presented to the antenna azimuth drive circuitry to provide synchronization of sinusoidal antenna azimuth scan with the CRT sinusoidal horizontal deflection.

The radar system of the present invention is functionally, entirely oscillatory, wherein the displayed deflection and video unblanking signals are derived from the radar pulse repetition frequency, thereby providing simplified timing and video processing. The advantages of the radar system of the present invention are its low input power requirements, the creation of a bright, highly resolute video display without the need for complex scan converter circuits, and its consequent small size and weight which make it suitable for airborne installation.

The foregoing and other objects, features and advantages of the present invention will become more apparent in light of the following detailed description of a preferred embodiment thereof, as illustrated in the accompanying drawings.

DESCRIPTION OF THE PREFERRED EMBODIMENT

Figure 3:
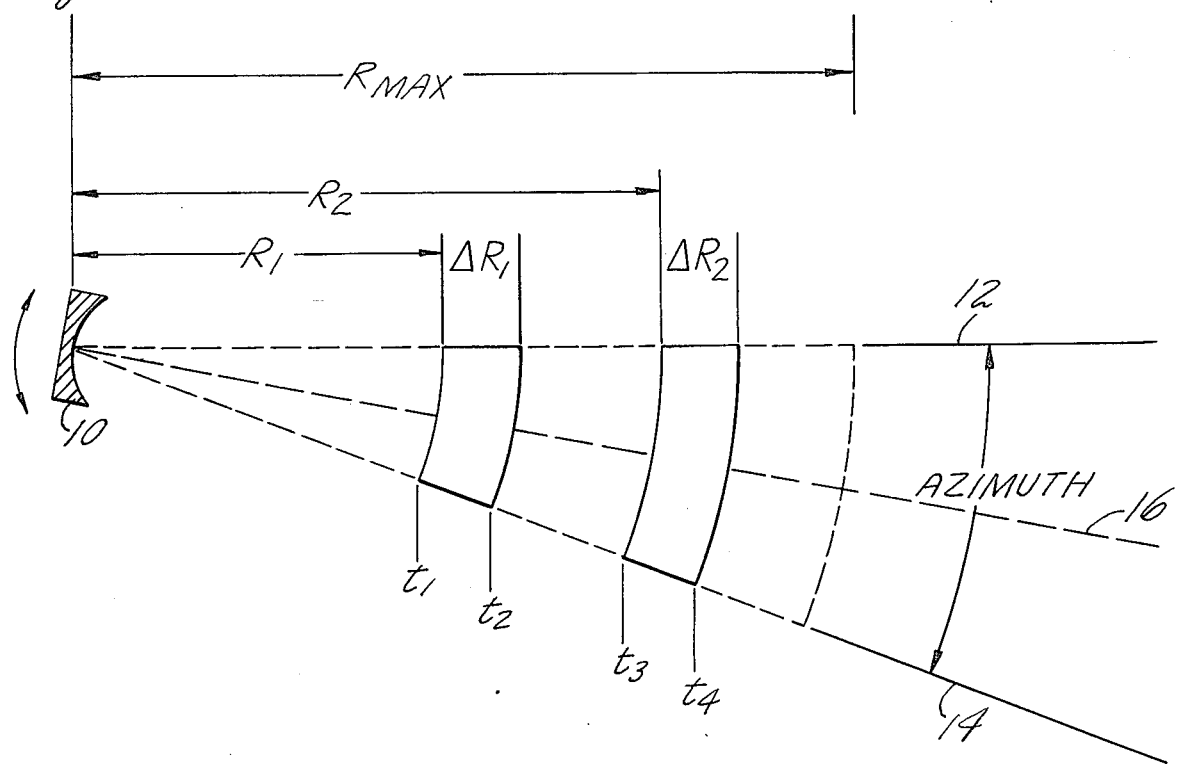
FIG. 3 is an illustration of a typical radar scanned azimuth sector.

The functional characteristics of an azimuth sector scan radar and its use on board military aircraft to provide fire control information are well known in the prior art, and feature the rapid radar scanning over a selected narrow sector of azimuth for the purpose of identifying a target within the sector, and for determining its range and relative azimuth bearing from that of the aircraft. Referring first to FIG. 3, a radar antenna 10 of a type well known to the state of the art, such as a single dipole mounted to a parabolic reflector, is scanned over an azimuth sector from a bearing at point 12 to a bearing at point 14 and then back to point 12, in a continual rapid scan rate. The azimuth sector selected is small, typically in the order of ±1° (approximately 17 milliradians) about a center azimuth bearing 16. The maximum range of the radar beam ($R_{max}$) is defined as the maximum distance at which a target within the sector may be identified. A range segment centered about the target in the azimuth sector is selected for display on a CRT, and may be presented in the form of a "B scan" display, or some similar display, where the range segment selected is displayed upon the full face of the CRT along the vertical axis and the azimuth bearing is displayed on the horizontal axis. The range segment may be selected for any range value less than $R_{max}$, and is of a fixed increment ($\Delta R_1$ or $\Delta R_2$ in FIG. 3).

Figure 1:
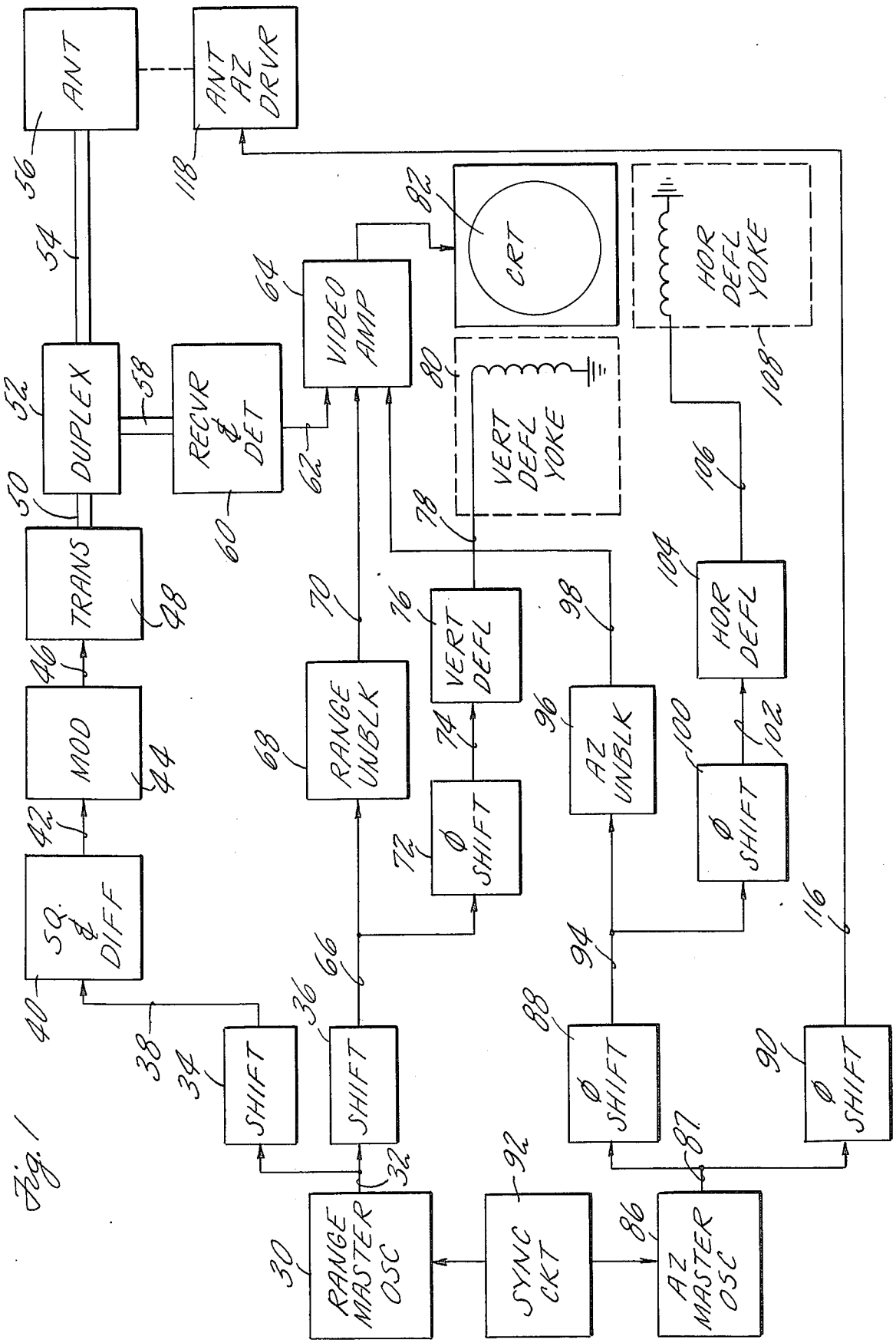
FIG. 1 is a schematic diagram of an exemplary embodiment of a sector scan radar system in accordance with the present invention.
Figure 2:
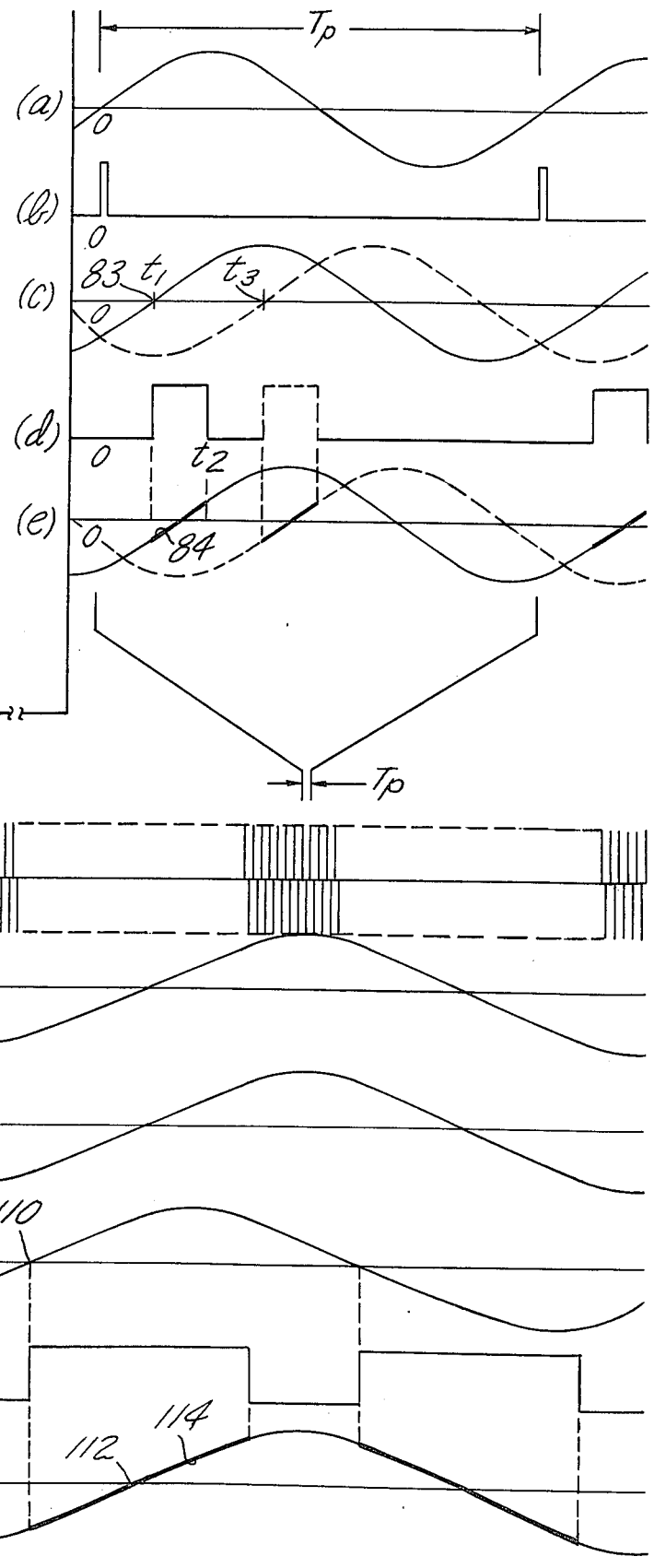
FIG. 2 is an illustration of the signal timing of the radar system of FIG. 1.

Referring now to FIG. 1, in an exemplary embodiment of an azimuth sector scan radar system according to the present invention, the transmitting and receiving functions of the radar together with the video display sweep signals and the antenna azimuth scan rate are synchronized in sinusoidal operation from the pulse repetition frquency of the radar main bang signal. A range master oscillator 30 provides a sinusoidal signal on a line 32 at a frequency selected for the pulse repetition frequency (PRF) of the system, with a time period $T_p$ as shown in FIG. 2, illustration (a). The maximum value of the PRF is limited by the maximum range of the radar ($R_{max}$) by the expression PRF = $C/2 \times R_{max}$, where C is the velocity of light ($3 \times 10^8$ meters/second). In the radar system of the present embodiment, the value of $R_{max}$ may be typically 25,000 ft. (7,620 meters) resulting in a typical minimum PRF of 19,685 Hz. As a described hereinafter, the relatively high PRF permits a high number of vertical deflections for a single azimuth scan (point 12 to point 14 of FIG. 3) creating a bright video display. The signal on the line 32 is presented to phase shift circuits 34, 36 which may be active phase shift networks of a type well known to the state of the art, each having phase shift values which are variable, and independently adjusted to create differing amounts of phase shift through each. The phase shift circuits provide sinusoidal output signals which are time delayed from the signal appearing on the line 32. The time delay created by the phase shift circuit 34 is used as a trim adjust to account for system time delay tolerances, and provides a sinusoidal signal on a line 38 to a squaring and differentiating circuit 40, which squares the signal appearing on the line 38 and then differentiates and detects the zero crossover of the positive going portion of the sinusoid. The positive pulses from the differentiator 40 appear on a line 42 at the pulse repetition frequency, as shown in FIG. 2, illustration (b). These pulses are used to provide the timing for the radar main bang signal by methods well known to the prior art. The pulses on the line 42 are received by a modulator 44 and are used to trigger a magnetron oscillator (providing a high frequency carrier signal in the order of 1,000 megacycles or greater) to produce a train of pulses of the desired pulsewidth on a line 46 that is connected to a transmitter 48. The transmitter 48 provides the high power radar pulse train (main bang signals) through a waveguide 50 to a duplexer 52, such as a transmit-receive switch (T-R switch). The duplexer 52 is connected through a waveguide 54 to an antenna 56, and through a waveguide 58 to a receiver and detector circuit 60. The duplexer 52 permits the use of a single antenna for both transmitting and receiving radar signals by providing a short across the waveguide 58 whenever a transmitted pulse appears in the waveguide 50. The output of the receiver and detector circuit 50 appears on a line 62 and is presented to a video amplifier 64 in the display portion of the system.

The phase shift network 36 produces a phase shift which is variable from zero to 360°, to provide a sinusoidal signal on a line 66 with a positive zero crossover which is time delayed from that of the signal on the line 32 by an amount which is equivalent to the distance (R) from the antenna to the beginning of the range segment selected for viewing, as defined by the expression $t_d = 2 \times R/C$ where $t_d$ is the time delay and C is the velocity of light. The signal on the line 66, shown in FIG. 2, illustration (c), is presented to a range unblank circuit 68 which detects the zero crossover of the positive going portion of the sinusoid and initiates a discrete signal on a line 70 which is presented to the video amplifier 64, with a fixed pulsewidth determined by the width of the range segment, as is described hereinafter. The signal on the line 66 is also presented to a phase shift network 72 which provides a sine wave on a line 74 that is phase shifted from the sine wave appearing on the line 66, as shown in FIG. 2, illustration (e). The signal on the line 74 is amplified by a vertical deflection amplifier 76 which provides a current signal on a line 78 to the vertical deflection yoke 80 of a CRT assembly 82.

In operation, the time delay between the signal on the line 66 and that on the line 32 is equivalent to the range from the antenna to the beginning of the selected range segment, as stated hereinbefore. This is shown in FIG. 3 with respect to the range segment $\Delta R_1$ where the quantity $R_1$ represents the distance from the range segment to the antenna 10. The range segment $\Delta R_1$ is to be displayed across the full face of the CRT 82, along its vertical axis, and the CRT must be unblanked for a small portion of the entire period ($T_p$) of the pulse repetition frequency, with a time period of unblanking being determined by the width of the range segment $\Delta R_1$, according to the expression $t_u = 2 \times \Delta R_1/C$, where $t_u$ is the period of unblanking following the time delay ($t_d$) discussed hereinbefore and C is the velocity of light. This is shown in FIG. 2, illustration (c), by the solid sine wave passing through the zero crossover 83 on its positive excursion, at a delay time $t_1$ ($t_1 = t_d$ for the range segment $\Delta R_1$) which is provided by the phase shift network 36. The range unblank circuit 68 detects the zero crossover point 83 and produces a discrete signal on the line 70, as shown in FIG. 2, illustration (d), with the leading edge of the discrete signal coincident with the zero crossover point at $t_1$. The discrete signal on the line 70 remains high until time $t_2$, as shown in FIG. 2, illustration (d), which corresponds to the unblank time period $t_u$ of the range segment $\Delta R_1$ ($t_u \times t_2 - t_1$), and provides a video unblank signal to the video amplifier 64. The phase shift network 72 creates a further delay in the signal on the line 66, causing the signal on the line 74 to achieve zero crossover midway through the pulsewidth of the unblank signal on the line 70, as shown in FIG. 2, illustration (e). This allows the most linear portion of the sine wave on the line 74 to be used as the vertical deflection signal on the vertical deflection yoke 80 during the unblank period. This is shown by the darkened segment 84 of illustration (e) of FIG. 2. The vertical deflection amplifier 76 amplifies the signal on the line 74, such that the linear segment 84 produces full scale vertical deflection across the face of the CRT 82. The vertical deflection yoke 80 responds to the entire sine wave appearing on the line 74 resulting in an overdrive of the vertical deflection coils but the video amplifier 64 is unblanked only for a portion of time corresponding to the period $t_2 - t_1$. Since no video signal is present during the overdeflection period no harm will result to the CRT 82, and the power required to drive the deflection coils is negligible (only that equal to the inherent losses of the yoke), while the simplicity of the vertical deflection drive circuitry resulting from such operation is evident. The selection of any range segment within the maximum range $R_{max}$ is performed in an identical manner to that described hereinbefore. Referring to FIG. 3, the range segment $\Delta R_2$ at a distance $R_2$ from the antenna 10 is selected for viewing by adjusting the phase shift network 36 to provide a new zero crossover point of the sine wave on the line 66, as shown by the zero crossover occuring at time $t_3$ of the dashed sine wave appearing in FIG. 2, illustration (c). The range unblank circuit 68 again detects the zero crossover occuring at $t_3$ and produces a coincident discrete signal on the line 70 as shown by the dashed waveform of FIG. 2, illustration (d), which provides a range unblank signal of the same pulsewidth duration as that previously created for the range segment $\Delta R_1$, but which now occurs as some later time from the transmission of the main bang signal. Similarly, phase shift network 72 causes the sine wave on the line 74 to achieve zero crossover at the midway point of the new range unblanked discrete signal. Vertical deflection of the video signal is limited to the most linear portion of the sine wave signal on the line 74 as shown by the darkened segment appearing on the dashed sine wave of FIG. 2, illustration (e).

Referring again to FIG. 1, an azimuth master oscillator 86 provides a low frequency sine wave signal on a line 87 to phase shift networks 88, 90. The frequency of the sine wave on the line 87 is equal to the frequency of the scan rate of the antenna 56. In the case of a mechanically resonant type antenna, discussed hereinafter, this is equal to the natural frequency of oscillation. A minimum signal frequency limit is provided by the desirability of a "flicker free" video display, achieved without the use of complex scan converter stages. This limit is variable and is dependent upon a number of system factors, including the amount of persistence of the phosphor coating which may be tolerated in the CRT 82, which in turn depends upon such factors as the speed with which the target may change in its relationship to the aircraft. For a zero persistence CRT, the minimum frequency would be approximately thirty Hz, which results in a horizontal scan rate of sixty scans per second (two scans, forward and reverse, for each complete cycle). The azimuth master oscillator 86 is synchronized with the range master oscillator 30 through the use of a synchronization circuit 92. Synchronization of these two signals causes the vertical display lines produced by the vertical deflection yoke 80 to appear stationary on the face of the CRT 82, which allows the use of an interlaced raster (not shown) to further reduce "flicker" if so required.

The sine wave appearing on the line 87 is shown in FIG. 2, illustration (g), and is a submultiple of the frequency of the signal from the range master oscillator 30 appearing on the line 32 and shown in FIG. 2, illustration (f). The phase shift network 88 produces a variable phase shift and provides a sine wave signal on a line 94 which leads the sine wave on the line 87 by a time increment which is equivalent to the difference between the total azimuth angle of the antenna scan and the azimuth angular component within the total scan selected for display, as shown by comparing FIG. 2, illustrations (i) and (g). In a system wherein the displayed azimuth angular component is fixed at a maximum value, a minimum time increment is provided to blank the azimuth video during the antenna change of direction, to prevent "burnout" of the edges of the CRT phosphor coating. The signal on the line 94 is presented to an azimuth unblank circuit 96, which detects the zero crossover of the positive going portion of the sine wave on the line 94 and provides a discrete signal on a line 98 to the video amplifier 64, having a fixed pulsewidth determined by the width of the azimuth segment. The signal on the line 94 is also presented to a phase shift network 100, which produces a sine wave on a line 102 that is phase shifted from the sine wave appearing on the line 94, as shown in FIG. 2, illustration (k). The signal on the line 102 is presented to a horizontal deflection amplifier 104, whose output signal on a line 106 is connected to the horizontal deflection yoke 108 of the CRT 82.

In operation, the phase shift network 88 produces a sine wave on the line 94, which leads the azimuth master oscillator signal, producing a zero crossover at point 110 (FIG. 2, illustration (i)) which is detected by the azimuth unblank circuit 96, providing a discrete signal on the line 98 whose leading edge is coincident with the zero crossover point 110, as shown in FIG. 2, illustration (j). The pulsewidth of the discrete signal on the line 98 corresponds to the number of azimuth degrees over which scanning is to be made. This signal is presented to the video amplifier 64, where in conjunction with the signal on the line 70 provides video unblanking permitting video information from the receiver and detector stage 60 to be displayed on the CRT 82. The signal on the line 94 is phase shifted by the phase shift network 100 to produce a sine wave on the line 102 with a zero crossover point 112 at the midpoint of the pulsewidth of the signal on the line 98, as shown by comparing FIG. 2, illustrations (k) and (j). As in the operation of the vertical deflection yoke described hereinbefore, the phase shift created by the phase shift network 100 permits the horizontal deflection of the unblanked video signal to occur during the linear portion of the azimuth master oscillator signal. This is further shown in FIG. 2, illustration (k) by the heavy lined segment 114. The horizontal deflection yoke 108 will respond to the entire amplitude of the sine wave appearing on the line 102, however, video will be displayed on the CRT only for that portion of the sine wave indicated by the darkened segment 114.

Referring again to FIG. 1, the phase shift network 90 produces an adjustable phase shift which is used as a trim adjustment to compensate for system tolerances, and provides a sine wave on a line 116 to an antenna azimuth driver 118. The sine wave on the line 116 is used as a synchronizing signal for the antenna azimuth driver 118, which provides the azimuth drive to the antenna 56.

The antenna 56, and antenna azimuth driver 118 may be of a standard type requiring an appropriate driving mechanism to produce the oscillatory azimuth scanning function required. This, however, may require extreme amounts of energy to produce the short azimuth strokes, and a much more favorable balance between required power and functional utility may be achieved through the use of a mechanically resonant type antenna structure. Such mechanically resonant antennas have been well known to the state of the art for many years, with their desirable feature being that the antenna assembly is caused to oscillate at the natural frequency which may be adjusted to coincide with the desired azimuth scan rate, with only small amounts of energy being required to replace that dissipated through natural loss in the system in order to maintain oscillation. Two early methods of providing a mechanically resonant antenna system are disclosed in a patent to Varian et al, U.S. Pat. No. 2,408,825, and a patent to Lyman et al, U.S. Pat. No. 2,713,121. Both of these methods employ the use of torsion springs to establish the oscillatory condition. An alternative, and more modern procedure may be found through use of torsion bar assemblies, or the like, where the antenna is mounted to one or more torsion bars rigidly fixed to a relatively stationary structure, such as the aircraft structure, with the mechanical constants of the antenna, torsion bars, and mounting configuration selected for resonance at the desired azimuth scan rate. For short range sector scan radars employing small antenna assemblies, such a mechanically resonant system provides an efficient and low power method of providing antenna drive. In addition, extremely high natural frequencies of oscillation may be achieved for smaller antenna assemblies, producing high azimuth scan rates in excess of 30 Hz to minimize flicker of the video display. In an alternative embodiment, the phase shift network 72 described hereinbefore, may be connected directly to the output of the range master oscillator 30. In this alternative embodiment, the phase shift network 72 receives the signal on the line 32, and provides total phase shift comprising: the phase shift attributable to the time delay required for the range segment selected in addition to the phase shift required to ensure zero crossover of the signal on the line 74 at a point midway through the pulsewidth of the unblank signal on the line 70. Similarly, the phase shift network 100 may likewise be connected directly to the output of the azimuth master oscillator 86. Wherein, the phase shift network 100 receives the signal on the line 87 and provides a total phase shift comprising: the phase shift required to produce the time increment related to the azimuth angular component selected for display in addition to the phase shift required to ensure zero crossover of the signal of the line 102, midway through the pulsewidth of the azimuth unblank signal on the line 98. In addition, modifications of the preferred embodiment may be made to provide for selectable magnitudes of the displayed range segment (ΔR) and displayed azimuth angular component, as may be obvious to one skilled in the art. Similarly, although the invention has been shown and described with respect to an illustrative embodiment thereof, it should be understood by those skilled in the art that the foregoing and various other changes, omissions and additions in the form and detail thereof may be made therein without departing from the spirit and the scope of the invention.

Having thus described a typical embodiment of my invention, that which I claim as new and desire to secure by Letters Patent of the United States is:

1. A radar system comprising:
   first oscillator means for generating a high frequency sinusoidal signal;
   a transmitter responsive to said first oscillator means for providing radar signals at a pulse repetition frequency determined by said first oscillator means;
   an antenna means responsive to said transmitter for transmitting radar signals and receiving target return radar signals;
   receiving means responsive to said antenna means for processing target return radar signals received by said antenna means;
   video display means for displaying information received by said receiving means and having vertical and horizontal deflection amplifier;
   range means responsive to said first oscillator means for providing a range unblank signal to said video display means, at a time delayed from the radar main bang by an amount related to the distance of the range segment containing the target from which return signals are desired for display on said video display means, and for providing a deflection signal to said video display means consisting of a sine wave having a suitable amplitude, in excess of the amplitude required for maximum deflection in the range dimension, and delayed from said unblank signal by a suitable amount such that a substantially linear portion of said sinusoidal range deflection signal, coincident with said range unblank signal, provides desired video display deflection in the range dimension during the desired range segment;
   second means for generating a low frequency sinusoidal signal of a frequency orders of magnitude lower than that of the signal produced by said high frequency sinusoidal means; and
   azimuth means responsive to said second means for providing an azimuth unblank signal to said video display means at a time delayed from said antenna azimuth drive signal by an amount related to the difference between the total azimuth angle of antenna scan, and the azimuth angular component thereof containing the target from which return signals are desired for display on said video display means, and for providing a deflection signal to said video display means consisting of a sine wave having a suitable amplitude, in excess of the amplitude required for maximum deflection in the azimuth dimension, and delayed from said azimuth unblank signal by a suitable amount such that a substantially linear portion of said sinusoidal azimuth deflection signal, coincident with said azimuth unblank signal, provides desired video display deflection in the azimuth dimension during the desired azimuth increment, and for providing synchronization of the antenna azimuth scan with the video display deflection in the azimuth dimension.

2. A radar system according to claim 1 wherein said second means for generating a low frequency sinusoidal signal is in synchronism with said first high frequency sinusoidal oscillator means.

3. A radar system according to claim 2 wherein said range means comprises:
 a first phase shift network, connected to the output of said first oscillator means, for producing an output sine wave that is selectively time delayed by an amount determined by the distance between said antenna means and the selected range segment contaiing the target;
 a range video unblanking circuit, connected for response to the output of said first phase shift network, for providing a range video unblanking signal to said video display means; and
 a second phase shift network connected to the output of said first phase shift network, for providing to the vertical deflection amplifier of said video display means an output sine wave that is time delayed from the sine wave produced from said first phase shift network by a suitable amount, such that a substantially linear portion of said delayed sine wave, coincident with said range video unblanking signal, provides the desired video vertical deflection for the selected range segment dimension.

4. A radar system according to claim 3 wherein said azimuth means comprises:
 a third phase shift network connected to the output of said low frequency means, for producing an output sine wave that is selectively time delayed from said low frequency sinusoidal signal by an amount determined by the difference between the total azimuth angle of antenna scan, and the azimuth angular component thereof selected for display on said video display means;
 an azimuth video unblanking circuit, connected for response to the output of said third phase shift network, for producing an azimuth video unblanking signal to said video display means;
 a fourth phase shift network connected to the output of said third phase shift network, for providing to the horizontal deflection amplifier of said video display means an output sine wave that is time delayed from the sine wave produced by said third phase shift network by a suitable amount, such that a substantially linear portion of said delayed sine wave, coincident with said azimuth video unblanking signal, provides the desired video horizontal deflection for the selected azimuth segment dimension; and
 a fifth phase shift network, connected to the output of said low frequency means, for providing a sine wave having a selectable time delay to said antenna means to synchronize the azimuth scanning rate of said antenna means with the horizontal deflection signal of said video display means.

* * * * *

UNITED STATES PATENT OFFICE
CERTIFICATE OF CORRECTION

PATENT NO. : 3,961,329
DATED : June 1, 1976
INVENTOR(S) : Herbert H. Naidich

It is certified that error appears in the above-identified patent and that said Letters Patent are hereby corrected as shown below:

Column 5, line 19, "X $t_2$" should read -- = $t_2$ --

Column 9, claim 3, line 29, "contaiing" should read

-- containing --

Signed and Sealed this

Twenty-fourth Day of August 1976

[SEAL]

Attest:

RUTH C. MASON
Attesting Officer

C. MARSHALL DANN
Commissioner of Patents and Trademarks